June 7, 1938.   W. L. McGEHEE ET AL   2,119,790
APPARATUS FOR MANUFACTURING DRIED FEED
Filed Jan. 18, 1937   2 Sheets-Sheet 1

INVENTORS
Wallace L. McGehee
Harold W. Luhnow
BY
ATTORNEYS.

June 7, 1938.  W. L. McGEHEE ET AL  2,119,790
APPARATUS FOR MANUFACTURING DRIED FEED
Filed Jan. 18, 1937   2 Sheets-Sheet 2

INVENTORS
Wallace L. McGehee
Harold W. Luhnow.
BY
ATTORNEYS.

Patented June 7, 1938

2,119,790

UNITED STATES PATENT OFFICE 2,119,790

APPARATUS FOR MANUFACTURING DRIED FEED

Wallace L. McGehee and Harold W. Luhnow, Kansas City, Mo.

Application January 18, 1937, Serial No. 121,124

11 Claims. (Cl. 34—34)

Our invention relates to the manufacture of readily digestible feed for poultry and livestock and it comprises an apparatus for making dry feeds from fresh fodder material, such as alfalfa, clover, soy beans, cow peas, etc., by treating the same in such manner as to retain a large percentage of the available proteids and the vitamins of the fresh cut material.

This application is a continuation in part of our Patent #2,100,907, issued November 30, 1937.

Grass, alfalfa, clover, cow peas, soy beans, etc., cut at the ordinary hay making stage are considerably more nutritious than the corresponding hay, in that the proteids and carbohydrates are more available. When alfalfa is at the hay making stage, the leaves constitute about 40 to 60 per cent of the weight and they contain approximately four-fifths of the protein of the whole plant, but when the cut alfalfa is left in the field to cure the leaves become dry and brittle and the loss by shattering is considerable. Rain and dew also may extract much of the valuable constituents, while losses by leaching may be as high as 40 per cent of the material. In both instances, the loss represents the most valuable portion of the material and reduces the digestibility and palatability of the finished product.

One of the purposes of the present invention is to produce a dehydrated alfalfa having approximately the original composition existing in the green alfalfa, and avoid loss by shattering, leaching, or detrimental changes in the contained enzymes, vitamins, proteins and carbohydrates.

While we regard our apparatus as more particularly useful in treating alfalfa, yet it may be used to treat other green feeds, such as grass, clover, soy beans, cow peas, etc. In the case of other leguminous feeds, it has much the value it has with alfalfa and for similar reasons. We shall, however hereinafter describe our apparatus more particularly as applied in the treatment of alfalfa.

In using the present apparatus, alfalfa or other green feed material is harvested in the customary way at the usual hay making stage and is cut into short pieces before any drying takes place, thereby avoiding the ordinary losses by shattering of leaves. If desired the short pieces may be further reduced in size. In drying, the water is removed comparatively slowly by evaporation into humid atmospheres, thereby avoiding undesirable changes in unripe forms of cellulose, starch, or other constituents, as well as changes in available proteids and in such delicate constituents as the vitamins.

In the accompanying drawings which show more or less diagrammatically a preferred form of apparatus capable of use in the production of the described product:—

Figure 1:
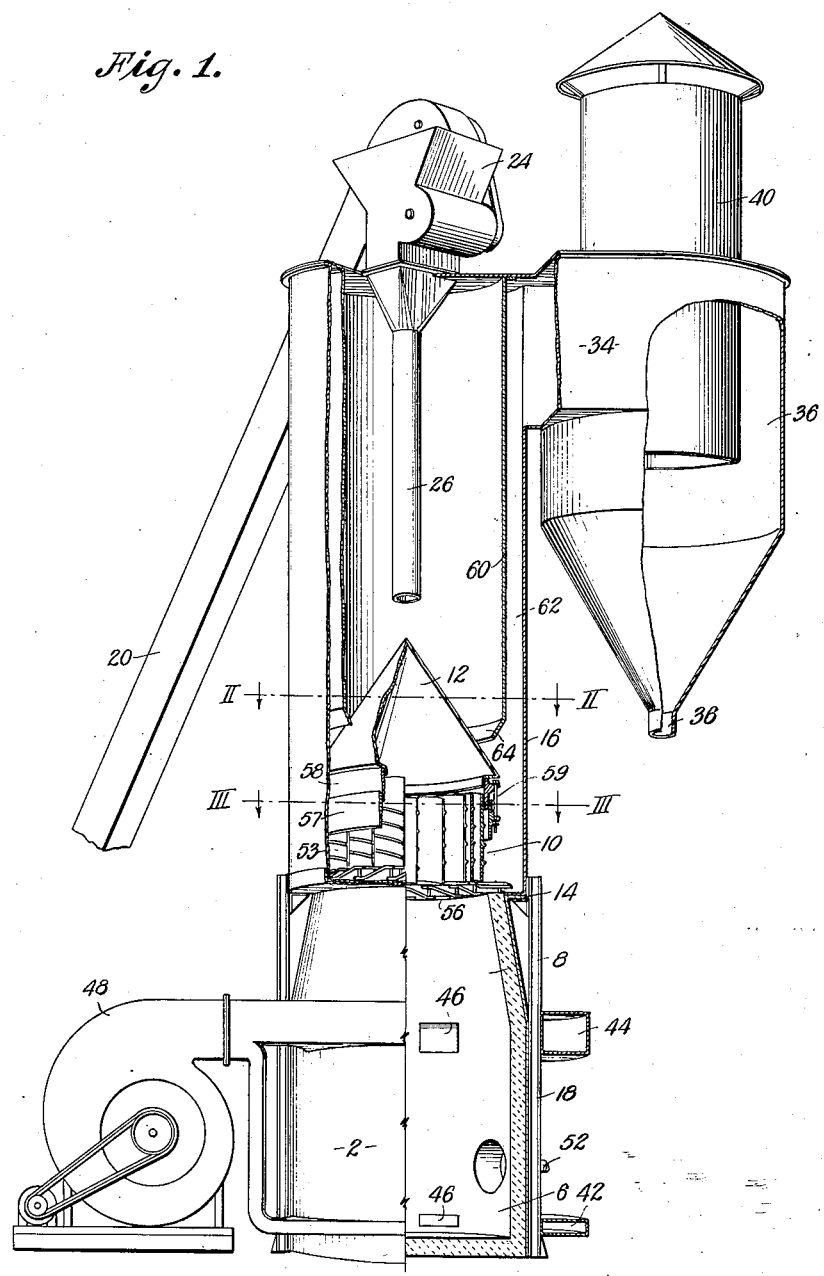
Fig. 1 is a side elevation of the apparatus embodying our invention, parts being broken away and in section.
Figure 2:
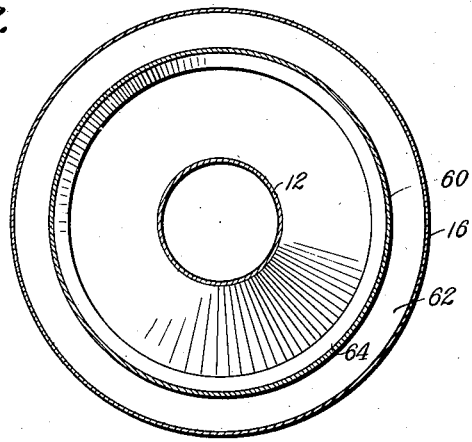
Fig. 2 is a cross sectional view taken on line II—II of Fig. 1.

In the structure shown by Fig. 1, 2 designates a vertically disposed furnace resting upon a concrete or other suitable foundation 4. The furnace 2 is divided into a combustion chamber 6, and a mixing chamber 8 surmounted by a stationary multi-bladed hot air distributor 10 communicating at its lower open end with the mixing chamber 8 and closed at its upper end by a conical top 12.

The upper end of the mixing chamber 8 is equipped with an annular member 14 which is assisted in supporting the hot air distributor 10 and a dehydrating chamber 16 by means of standards 18 extending upwardly from the foundation 4. The dehydrating chamber 16 is vertically disposed upon the annular member 14 in axial alinement with the furnace 2 and adapted to receive the green fodder at its upper portion through a pipe 20 leading upwardly from a silage cutter and blower not shown. The pipe 20 discharges the green fodder into a hopper 24 having a duct 26 depending therefrom through which the green fodder travels to a zone above the apex of conical top 12.

The upper portion of the dehydrating chamber 16 communicates through a duct 34 with a pneumatic separator 36, preferably of the cyclone type, having an outlet 38 at its lower end through which the finished product is discharged, and an air stack 40 at its upper portion through which the moist waste gases escape to atmosphere.

In order to obtain a large volume of air to support combustion and for utilization in drying the green feed, we provide a primary air duct 42 near the bottom of the furnace 2, and a secondary air duct 44 located about midway between the top and bottom of said furnace. Each air duct is of segmental form and extends about three-fourths of the way around the exterior portion of the furnace 2 with the interior of which it communicates through a suitable number of equally spaced outlets 46. The outlets 46 are arranged on a tangent with the inner surface of the furnace 2 to impart a whirling action to the air received from a blower 48 and discharged into the furnace 2 through said outlets 46. The air when discharged into the furnace 2 is heated to the desired temperature with suitable fuel such as gas or oil discharged from a burner 52 located at the lower portion of the furnace.

Figure 3:
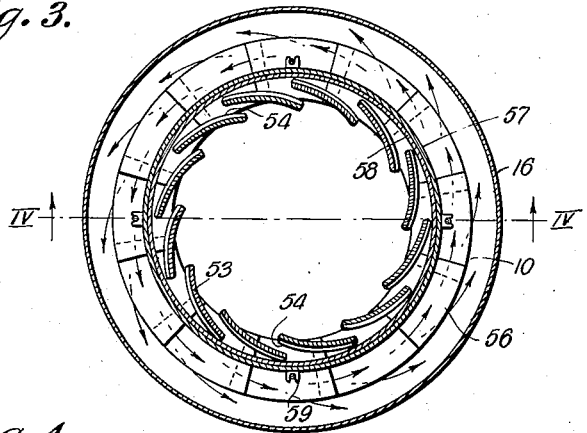
Fig. 3 is a section taken on line III—III of Fig. 1.
Figure 4:
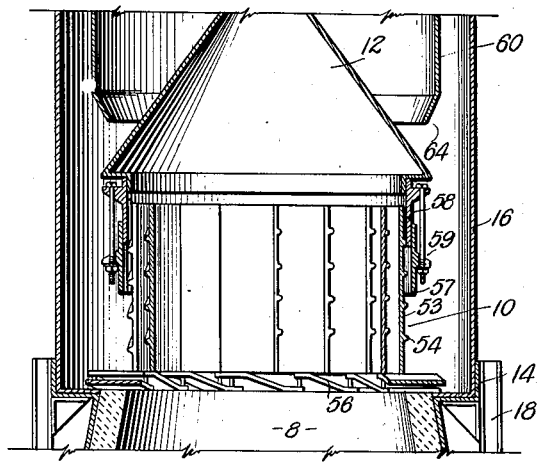
Fig. 4 is an enlarged, vertical, fragmentary central sectional view through the distributor taken along line IV—IV of Fig. 3.

The distributor assembly 10, which is arranged vertically above furnace 2, comprises a plurality of blades 53 arranged vertically in a circumscribing path concentric with the axis of the dehydrating chamber 16 and in relative over-lapping relation as shown in Fig. 3. Spaces between over-lapping blades 53 form outlets for heated air passing in spiral paths from mixing chamber 8 of the furnace 2 to dehydrating chamber 16. Such outlets are substantially tangent to the inner wall of chamber 16 and contribute to maintain the said spiral direction of travel.

The outer faces of blades 53 have inclined ribs 54 thereon that serve to direct downwardly a part of the air, passing through the spaces between blades 53. Thus the upper sides of the over-lapping plates 56 are swept clean during the period of operation.

Plates 56 are substantially horizontal and, by their arrangement, provide spaces therebetween which permit the passage of some of the upwardly traveling air from mixing chamber 8. They bridge the ring-shaped opening between annular member 14 and blades 53.

The amount of effective space between blades 53 is controlled by an adjustable collar 57. This collar 57 is hung upon an annular skirt 58, which is rigid with conical top 12, through the medium of bolt and nut assemblies 59, the manipulation of which will move collar 57 up or down.

An annular partition 60 of cylindrical form is within dehydrating chamber 16 to set off an annular space 62. This partition depends from the top of dehydrating chamber 16 and terminates intermediate the base and apex of conical top 12. The lower end of partition 60 has an inturned lip 64 thereon which slightly restricts the opening between the surface of top 12 and the lower edge of partition 60 and serves to direct outgoing feed particles into the annular space 62.

Duct 34 communicates with annular space 62 at the top of dehydrating chamber 16.

In the operation of the apparatus, alfalfa or other green feed material fresh from the field is cut into lengths of from one to three inches with the silage cutter 22 and then blown therefrom to the upper portion of the dehydrating chamber 16 through the pipe 20 which discharges it into the duct 26. It is then dropped downwardly upon the conical top 12 which distributes it outwardly in approximately a uniform manner in the lower portion of the dehydrating chamber 16. The distributed material is spread outwardly in a comparatively thin layer so that all particles thereof come into intimate contact with the hot air which absorbs moisture therefrom and conveys the ground feed upwardly in a helical path through space 62 about the vertical axis of the dehydrating chamber 16 to the pneumatic separator 36, from which the humid air escapes through the stack 40 while the finished product is discharged from the outlet 38. As the hot air passes upwardly through the dehydrating chamber 16 it circulates around cylindrical partition 60 and thereby preheats the material descending therethrough and hastens the drying process to that extent.

Temperatures of the hot air may range from 250 to as high as 1600 degrees F., it depending somewhat on the character and moisture content of the material being dried and the speed at which it is run through the dehydrating chamber 16. The higher the temperature the more rapid will be the upward circulation of the hot moist air so that the material will be carried out of the dehydrating chamber 16 before it can become damaged by the higher temperatures.

The outer air on being discharged into the furnace 2 through the primary air duct 42 is heated to a high temperature by the hot products of combustion and as its ascends through the furnace 2 with the products of combustion its volume is increased and temperature decreased by additional hot air supplied through the secondary air duct 44. Thus by the time the hot air enters the dehydrating chamber 16 through distributor assembly 10 its temperature has been reduced to such extent as to avoid bringing about undesirable changes in the available proteids and in such delicate constituents as the vitamins or enzymes, but is sufficient to dry the feed during the long travel over the helical path pursued from the lower to the upper portion of the dehydrating chamber 16.

As some of the particles will be separated from each other while others will be grouped together to a greater or less extent, it is apparent that the separated particles will become dried in less time and would therefore become damaged more or less if held back by baffles or other mechanical obstructions in the space 62, but as they have a clear passage way it is apparent that they will, on becoming dried, be carried by the hot air from the dehydrating chamber ahead of the grouped particles which are retarded due to their greater specific gravity, thus a finished product of uniform quality is insured.

Green fodder materials which may be successfully treated with our apparatus comprise clover, alfalfa, timothy, corn stalks, and the tops and leaves of soy beans, cow peas, and the like.

While we have shown one form of apparatus, we reserve all rights to such other forms and modifications thereof as properly fall within the spirit and scope of the invention as claimed.

Having thus described our invention, what we claim and desire to secure by Letters Patent, is:

1. In an apparatus of the character described, a vertically disposed dehydrating chamber; a stationary distributor, provided with vertical openings arranged in a circle, axially arranged within said dehydrating chamber; ribs on the distributor, extending into the openings for directing the air into spiral paths as it passes through the openings; a duct within the chamber and disposed to discharge green feed downwardly upon said distributor; a partition circumscribing the duct and setting off an annular space of appreciable length within the dehydrating chamber for the reception of feed after its engagement with the distributor; and a furnace for directing currents of hot air upwardly through the openings in the distributor and thereafter spirally upwardly through said space.

2. In an apparatus of the character described, a vertically disposed dehydrating chamber; a furnace below the dehydrating chamber and in direct axial connection therewith; a burner in the furnace; a stationary distributor in the dehydrating chamber at the zone of connection between said furnace and said dehydrating chamber; and a duct arranged to discharge green feed downwardly upon said distributor, said distributor comprising a conical top and a plurality of vertical blades arranged in an annular path immediately below and co-axial with said top and in spaced apart overlapping relation to form outlets therebetween for heated air and products of combustion from the furnace.

3. In an apparatus of the character described, a vertically disposed dehydrating chamber; a furnace below the dehydrating chamber and in direct axial connection therewith; a burner in the furnace; a stationary distributor in the dehydrating chamber at the zone of connection between said furnace and said dehydrating chamber; and a duct arranged to discharge green feed downwardly upon said distributor, said distributor comprising a conical top and a plurality of blades arranged below the top in spaced apart overlapping relation to form outlets therebetween for heated air and products of combustion from the furnace, said blades each having a number of ribs on the outer sides respectively thereof for further directing a part of the air and products of combustion.

4. In an apparatus of the character described, a vertically disposed dehydrating chamber; a furnace below the dehydrating chamber and in direct axial connection therewith; a burner in the furnace; a stationary distributor in the dehydrating chamber at the zone of connection between said furnace and said dehydrating chamber; a duct arranged to discharge green feed downwardly upon said distributor, said distributor comprising a conical top, a plurality of blades arranged below the top in spaced apart overlapping relation to form outlets therebetween for heated air and products of combustion from the furnace; and an adjustable collar for restricting desired amounts of the outlets.

5. In an apparatus of the character described, a vertically disposed dehydrating chamber; a furnace below the dehydrating chamber and in direct axial connection therewith; a burner in the furnace; a stationary distributor in the dehydrating chamber at the zone of connection between said furnace and the dehydrating chamber; and a duct arranged to discharge green feed downwardly upon said distributor, said distributor comprising a conical top, a plurality of blades arranged in a circumscribing path immediately below the top in spaced apart overlapping relation to form outlets therebetween for heated air and products of combustion from the furnace, and a plurality of substantially horizontal, overlapped, spaced apart plates between the blades and inner wall of said chamber to provide further outlets for heated air and products of combustion from the furnace.

6. In an apparatus of the character described, a vertically disposed dehydrating chamber; a furnace below the dehydrating chamber and in direct axial connection therewith; a burner in the furnace; a stationary distributor in the dehydrating chamber at the zone of connection between said furnace and the dehydrating chamber; and a duct arranged to discharge green feed downwardly upon said distributor, said distributor comprising a conical top, a plurality of blades arranged in a circumscribing path immediately below the top in spaced apart overlapping relation to form outlets therebetween for heated air and products of combustion from the furnace, and a plurality of substantially horizontal, overlapped, spaced apart plates between the blades and inner wall of said chamber to provide further outlets for heated air and products of combustion from the furnace, said blades and plates being positioned to direct the rising air and products of combustion into spiral paths adjacent the inner wall of the dehydrating chamber.

7. In an apparatus of the character described, a vertically disposed dehydrating chamber; a furnace below the dehydrating chamber and in direct axial connection therewith; a burner in the furnace; a stationary distributor in the dehydrating chamber at the zone of connection between said furnace and the dehydrating chamber; and a duct arranged to discharge green feed downwardly upon said distributor, said distributor comprising a conical top, a plurality of blades arranged in a circumscribing path immediately below the top in spaced apart overlapping relation to form outlets therebetween for heated air and products of combustion from the furnace, and a plurality of substantially horizontal, overlapped, spaced apart plates between the blades and inner wall of said chamber to provide further outlets for heated air and products of combustion from the furnace, said blades each having a number of ribs on the outer sides respectively thereof for directing a part of the heated air across the tops of the plates for the purpose specified.

8. In an apparatus of the character described, a vertically disposed dehydrating chamber; a furnace below the dehydrating chamber and in direct axial connection therewith; a burner in the furnace; a stationary distributor in the dehydrating chamber at the zone of connection between said furnace and the dehydrating chamber; and a duct arranged to discharge green feed downwardly upon said distributor, said distributor comprising a conical top, a plurality of blades arranged in a circumscribing path immediately below the top in spaced apart overlapping relation to form outlets therebetween for heated air and products of combustion from the furnace, and a plurality of substantially horizontal, overlapped, spaced apart plates between the blades and inner wall of said chamber to provide further outlets for heated air and products of combustion from the furnace, said blades each having a number of ribs on the outer sides respectively thereof for directing a part of the heated air across the tops of the plates for the purpose specified, said distributor having an adjustable collar circumscribing the plates for restricting desired amounts of the outlets.

9. In an apparatus of the character described, a vertically disposed dehydrating chamber; a furnace below the dehydrating chamber and in direct axial connection therewith; a burner in the furnace; a stationary distributor in the dehydrating chamber at the zone of connection between said furnace and the dehydrating chamber; a cylindrical partition in the dehydrating chamber to set off an annular space therein above the distributor; and a duct arranged to discharge green feed downwardly upon said distributor, said distributor comprising a conical top, a plurality of blades arranged in a circumscribing path immediately below the top in spaced apart overlapping relation to form outlets therebetween for heated air and products of combustion from the furnace, and a plurality of substantially horizontal, overlapped, spaced apart plates between the blades and inner wall of said chamber to provide further outlets for heated air and products of combustion from the furnace, said blades and plates being positioned to direct the rising air and products of combustion into spiral paths and into the annular space between the partition and inner face of the dehydrating chamber.

10. In an apparatus of the character described, a vertically disposed dehydrating chamber; a furnace below the dehydrating chamber and in direct axial connection therewith; a burner in the furnace; a stationary distributor in the dehydrating chamber at the zone of connection between said furnace and the dehydrating chamber; a cylindrical partition in the dehydrating chamber to set off an annular space therein above the distributor; and a duct arranged to discharge green feed downwardly upon said distributor, said distributor comprising a conical top, a plurality of blades arranged in a circumscribing path immediately below the top in spaced apart overlapping relation to form outlets therebetween for heated air and products of combustion from the furnace, and a plurality of substantially horizontal, overlapped, spaced apart plates between the blades and inner wall of said chamber to provide further outlets for heated air and products of combustion from the furnace, said blades and plates being positioned to direct the rising air and products of combustion into spiral paths and into the annular space between the partition and inner face of the dehydrating chamber, said cylindrical partition having its lower end open and circumscribing the said conical top intermediate the base and apex thereof.

11. In an apparatus of the character described, a vertically disposed dehydrating chamber; a furnace below the dehydrating chamber and in direct axial connection therewith; a burner in the furnace; a stationary distributor in the dehydrating chamber at the zone of connection between said furnace and the dehydrating chamber; a cylindrical partition in the dehydrating chamber to set off an annular space therein above the distributor; and a duct arranged to discharge green feed downwardly upon said distributor, said distributor comprising a conical top, a plurality of blades arranged in a circumscribing path immediately below the top in spaced apart overlapping relation to form outlets therebetween for heated air and products of combustion from the furnace, and a plurality of substantially horizontal, overlapped, spaced apart plates between the blades and inner wall of said chamber to provide further outlets for heated air and products of combustion from the furnace, said blades and plates being positioned to direct the rising air and products of combustion into spiral paths and into the annular space between the partition and inner face of the dehydrating chamber, said cylindrical partition having its lower end open and circumscribing the said conical top intermediate the base and apex thereof, the lower end of said cylindrical partition having an inturned lip thereon extending toward the outer surface of the conical top.

WALLACE L. McGEHEE.
HAROLD W. LUHNOW.